(12) United States Patent
Kim et al.

(10) Patent No.: US 8,763,201 B2
(45) Date of Patent: Jul. 1, 2014

(54) VACUUM CLEANER PROVIDED WITH DUST-REMOVING DEVICE

(75) Inventors: Tak-Soo Kim, Gwangju (KR); Keon-soo Choi, Gwangju (KR); Young-Jun Cho, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 311 days.

(21) Appl. No.: 13/138,988

(22) PCT Filed: Feb. 9, 2010

(86) PCT No.: PCT/KR2010/000803
§ 371 (c)(1),
(2), (4) Date: Nov. 9, 2011

(87) PCT Pub. No.: WO2010/131833
PCT Pub. Date: Nov. 18, 2010

(65) Prior Publication Data
US 2012/0047683 A1 Mar. 1, 2012

(30) Foreign Application Priority Data
May 11, 2009 (KR) .................. 10-2009-0040805

(51) Int. Cl.
*A47L 9/10* (2006.01)
*A47L 9/20* (2006.01)

(52) U.S. Cl.
USPC .............................................. 15/347; 15/352

(58) Field of Classification Search
CPC .............. A47L 5/28; A47L 9/165; A47L 9/20; A47L 9/1683; A47L 9/1681; A47L 9/1625; B01D 46/42

USPC .............. 15/350, 352, 353, 347; 55/337, 357, 55/300, 304, 429, 430, DIG. 3
See application file for complete search history.

(56) References Cited

U.S. PATENT DOCUMENTS 6,598,263 B2 * 7/2003 Boles et al. ............. 15/352
6,648,934 B2 11/2003 Choi et al.
(Continued)

FOREIGN PATENT DOCUMENTS

| CN | 201197695 | 2/2009 |
| JP | 2003-116752 | 4/2003 |
| KR | 10-2001-0108805 | 12/2001 |
| KR | 10-2002-0091423 | 12/2002 |

(Continued)

OTHER PUBLICATIONS

International Search Report for PCT/KR2010/000803 mailed Jun. 18, 2010.
(Continued)

*Primary Examiner* — Dung Van Nguyen
(74) *Attorney, Agent, or Firm* — Staas & Halsey LLP

(57) ABSTRACT

A vacuum cleaner having a dust removing apparatus includes a main body in which a dust collecting unit is disposed, a filter disposed inside the dust collecting unit, the dust removing apparatus to dust off the filter, a rotating handle that allows the dust removing apparatus to be rotated, the rotating handle disposed in an outer surface of the dust collecting unit, and a body cover in which a rotating-handle exposing hole is formed for the rotating handle to be exposed outside in a state that the dust collecting unit is disposed in the main body, the body cover rotatably disposed at the main body. The vacuum cleaner can remove dust from filter regardless whether the dust collecting unit is disposed in or separated from the main body. The vacuum cleaner also can remove dust from the filter while the vacuum cleaner operates.

6 Claims, 5 Drawing Sheets

(56) References Cited

U.S. PATENT DOCUMENTS

| | | | |
|---|---|---|---|
| 6,758,874 B1 * | 7/2004 | Hunter, Jr. | 55/337 |
| 7,351,269 B2 * | 4/2008 | Yau | 55/297 |
| 7,704,290 B2 * | 4/2010 | Oh | 55/295 |
| 7,785,381 B2 * | 8/2010 | Oh et al. | 55/300 |
| 8,615,844 B2 * | 12/2013 | Van Raalte et al. | 15/352 |
| 2003/0066273 A1 | 4/2003 | Choi et al. | |
| 2003/0208879 A1 | 11/2003 | Oh et al. | |
| 2004/0211025 A1 | 10/2004 | Jung et al. | |
| 2007/0175185 A1 | 8/2007 | Kim et al. | |

FOREIGN PATENT DOCUMENTS

| | | |
|---|---|---|
| KR | 10-2004-0036185 | 4/2004 |
| KR | 10-2005-0106191 | 11/2005 |
| KR | 10-2006-0098765 | 9/2006 |

OTHER PUBLICATIONS

Chinese Office Action issued Jul. 29, 2013 in corresponding Chinese Application No. 201080020443.7.

* cited by examiner

VACUUM CLEANER PROVIDED WITH DUST-REMOVING DEVICE

CROSS-REFERENCE TO RELATED APPLICATIONS

This application is a U.S. national phase of International Application No. PCT/KR2010/000803 filed on Feb. 9, 2010, which claims priority to Korean Patent Application No. 2009-0040805, filed May 11, 2009 in the Korean Intellectual Property Office, the disclosures of which are incorporated herein by reference in its entirety.

BACKGROUND

1. Field

The present disclosure relates to a cleaning apparatus such as a home use cleaner, an industrial use cleaner, a business use cleaner, etc. More particularly, the present disclosure relates to a vacuum cleaner having a dust removing apparatus that can remove dust from a filter disposed inside a dust-collecting unit in a state that the dust-collecting unit is not separated from a cleaner body.

2. Description of the Related Art

Generally, a vacuum cleaner is provided with a filter that separates and collects dust. The filter collects fine dust that is not separated by a centrifugal separating member or a dust bag, thereby improving a cleaning efficiency and sanitation for users.

However, when the vacuum cleaner has been used for a long time, large dust particles accumulate on the filter so that an air discharging function of the filter is deteriorated. The deterioration in the air discharging function of the filter causes problems such as decreasing the cleaning efficiency, overloading of the vacuum cleaner, decreased sanitation for users, etc.

To maintain the vacuum cleaner in an optimal condition, a user is required to periodically separate the filter from the vacuum cleaner and clean the filter. Therefore, the user does not feel comfortable in use of the vacuum cleaner.

Accordingly, a conventional vacuum cleaner was provided in which dust collected on the filter can be removed in a state that the filter is not separated from the vacuum cleaner.

Japanese Patent Publication No. 2007-125294 discloses a manipulating portion that rotates a cleaning member to remove dust collected on a pleated filter.

In the conventional vacuum cleaner, the cleaning member cannot be rotated when a dust-collecting unit is mounted in a main body of the vacuum cleaner so that when the vacuum cleaner operates, the dust collected on the filter cannot be removed.

SUMMARY

The present disclosure has been developed in order to overcome the above drawbacks and other problems associated with the conventional arrangement. An aspect of the present disclosure is to provide a vacuum cleaner that can allow dust collected on a filter disposed in a dust collecting unit to be removed regardless of whether the dust collecting unit is mounted in the vacuum cleaner or not.

Furthermore, another aspect of the present disclosure is to provide a vacuum cleaner that can allow dust collected on a filter disposed in a dust collecting unit to be removed while the vacuum cleaner operates.

The above aspect and/or other feature of the present disclosure can substantially be achieved by providing a vacuum cleaner, which may include a main body in which a dust collecting unit is disposed; a filter disposed inside the dust collecting unit; a dust removing apparatus to remove dust from the filter; a rotating handle that allows the dust removing apparatus to be rotated, the rotating handle disposed in an outer surface of the dust collecting unit; and a body cover in which a rotating-handle exposing hole is formed for the rotating handle to be exposed outside in a state that the dust collecting unit is disposed in the main body, the body cover rotatably disposed at the main body.

The dust collecting unit may be configured to rotate the dust removing apparatus by the rotating handle in a state that the dust collecting unit is disposed in the main body or in a state that the dust collecting unit is separated from the main body.

The dust collecting unit may be configured to rotate the dust removing apparatus by the rotating handle during operation of the vacuum cleaner.

The dust collecting unit may have an inner space divided into a first dust collecting region to collect dust separated in a centrifugal separating member and a second dust collecting region to collect dust removed from the filter.

The dust collecting unit may include a dust discharging cover that is connected to a lower end of the dust collecting unit to be opened and closed to discharge at the same time the dust collected both in the first dust collecting region and the second dust collecting region, and the dust discharging cover includes a dust-container air-discharging port to discharge air from the dust collecting unit.

The rotating handle for driving a dust removing apparatus of a vacuum cleaner according to an embodiment of the present disclosure may be configured to be rotated by a motor.

A dust removing apparatus of a vacuum cleaner according to an embodiment of the present disclosure allows dust collected on a filter disposed inside a dust collecting unit to be easily removed from the filter regardless whether the dust collecting unit is disposed in a main body of the vacuum cleaner or separated from the main body.

Other objects, advantages and salient features of the disclosure will become apparent from the following detailed description, which, taken in conjunction with the annexed drawings, discloses preferred embodiments of the disclosure.

BRIEF DESCRIPTION OF THE DRAWINGS

These and/or other aspects and advantages of the disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Hereinafter, certain exemplary embodiments of the present disclosure will be described in detail with reference to the accompanying drawings.

The matters defined in the description, such as a detailed construction and elements thereof, are provided to assist in a comprehensive understanding of the disclosure. Thus, it is apparent that the present disclosure may be carried out without those defined matters. Also, well-known functions or constructions are omitted to provide a clear and concise description of exemplary embodiments of the present disclosure.

Figure 1:
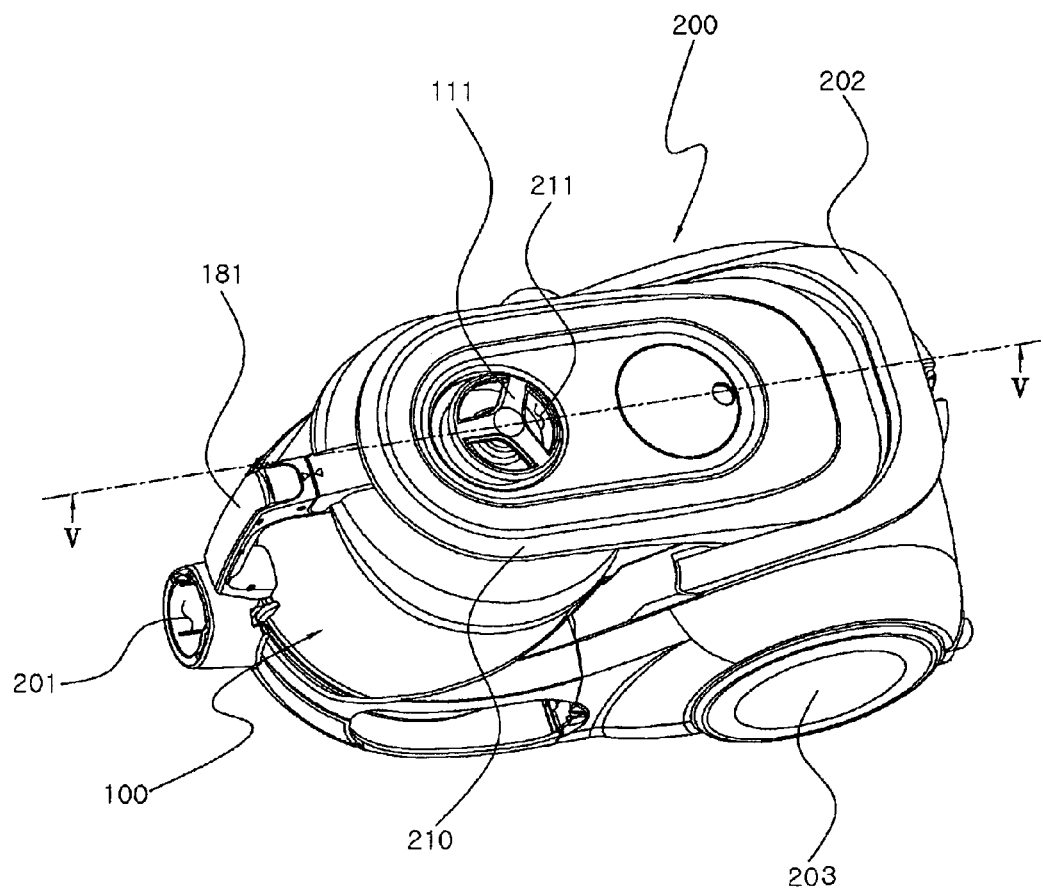
FIG. 1 is a perspective view illustrating a vacuum cleaner according to an embodiment of the present disclosure.
Figure 2:
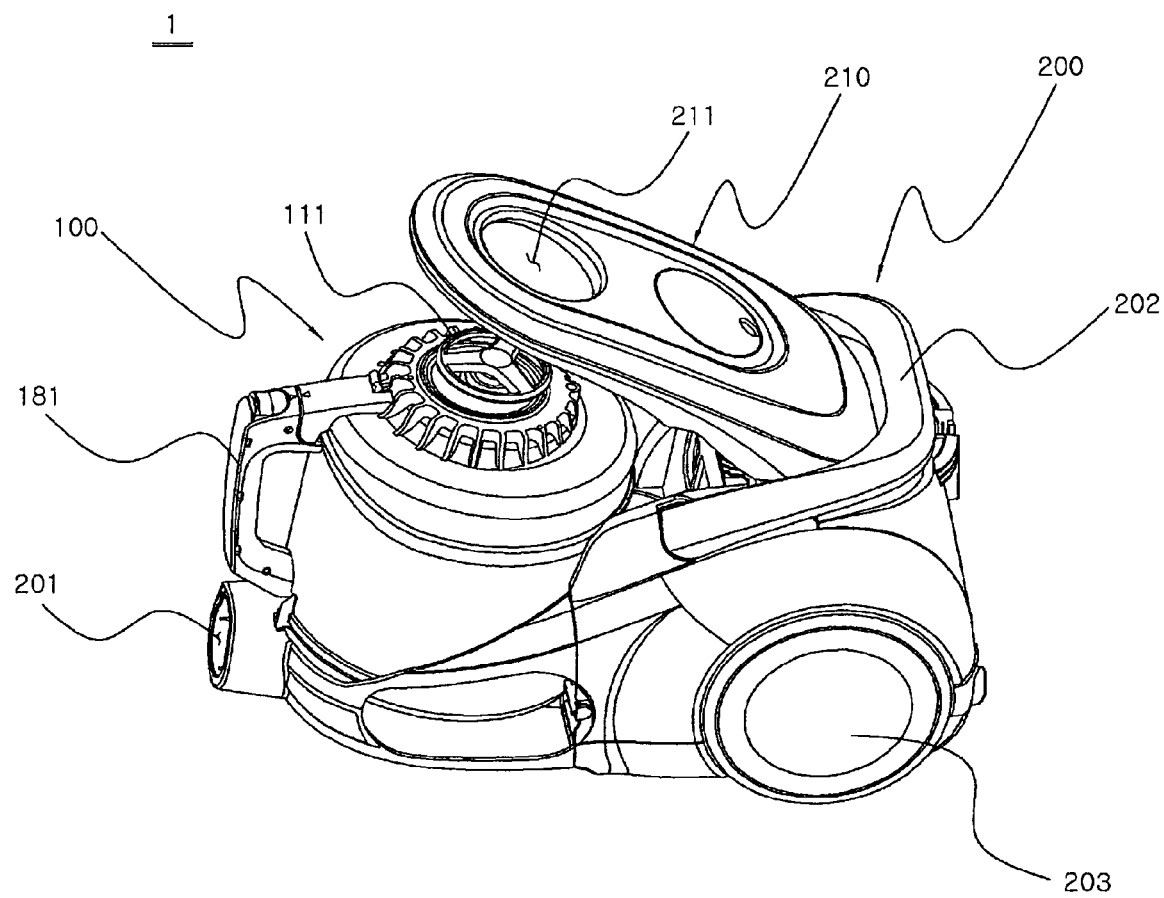
FIG. 2 is a perspective view illustrating the vacuum cleaner of FIG. 1 when a body cover thereof is opened.
Figure 3:
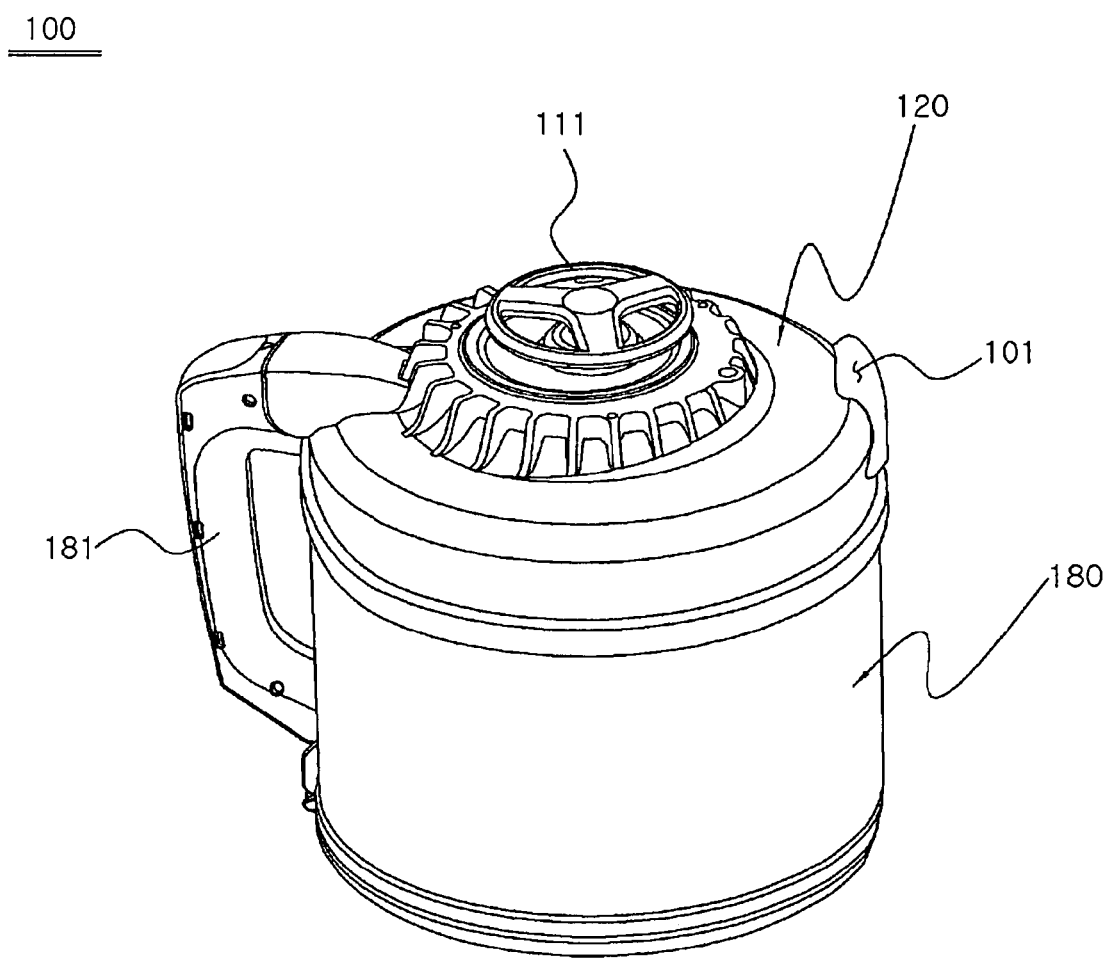
FIG. 3 is a perspective view illustrating a dust collecting unit separated from the vacuum cleaner of FIG. 1.
Figure 4:
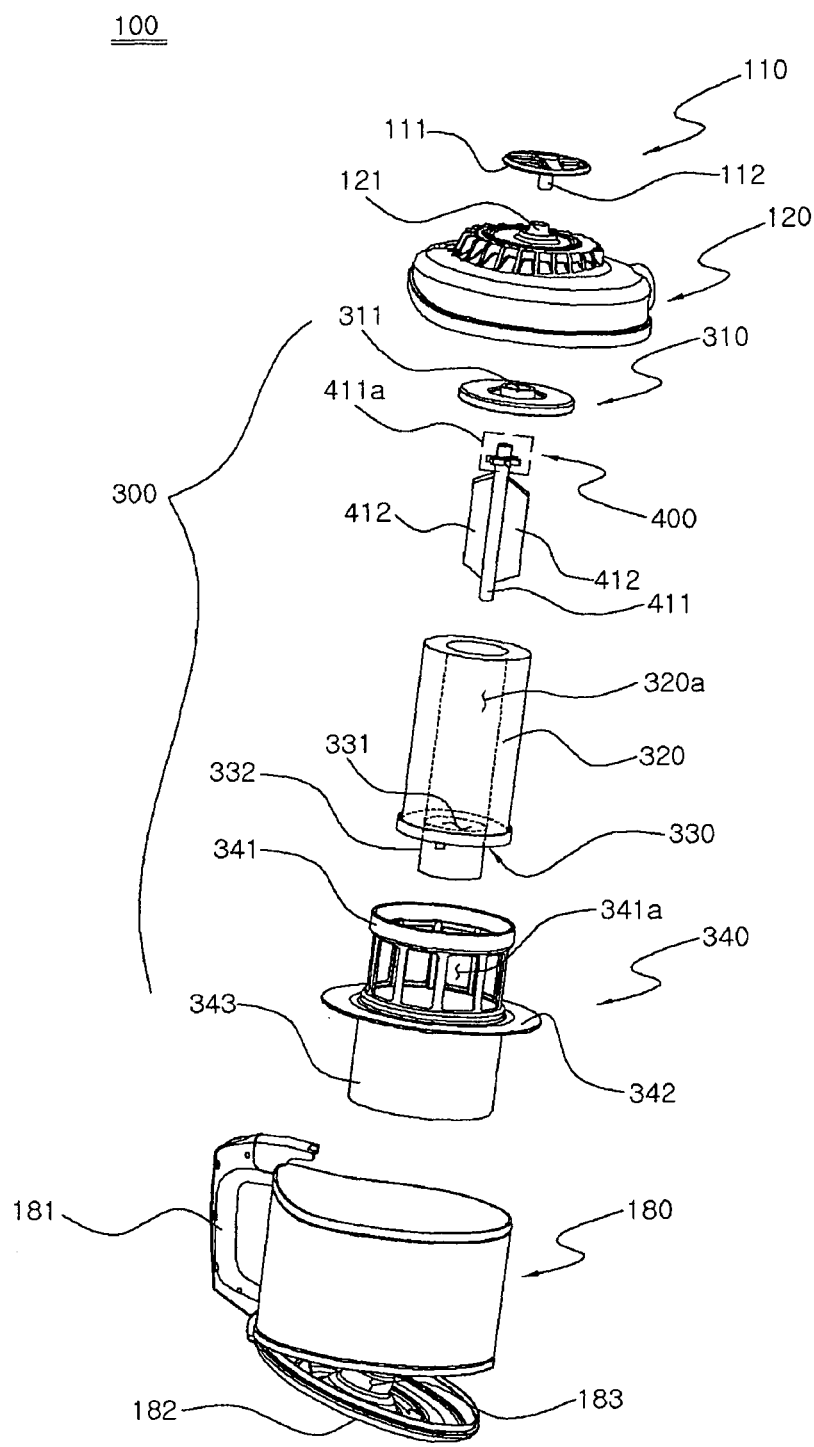
FIG. 4 is an exploded perspective view illustrating the dust collecting unit of FIG. 3.

FIG. 1 is a perspective view illustrating a vacuum cleaner 1 according to an embodiment of the present disclosure and FIG. 2 is a perspective view illustrating the vacuum cleaner 1 of FIG. 1 when a body cover 210 thereof is opened. FIG. 3 is a perspective view illustrating a dust collecting unit 100 separated from the vacuum cleaner 1 of FIG. 1. FIG. 4 is an exploded perspective view illustrating the dust collecting unit 100 of FIG. 3.

Referring to FIGS. 1 to 4, the vacuum cleaner 1 may include the dust collecting unit 100 and a main body 200.

The main body 200 may include a nozzle connecting hole 201, a body cover 210 having a rotating-handle exposing hole 211, a body handle 202, and wheels 203 for moving the vacuum cleaner 1.

The nozzle connecting hole 201 is formed at a lower portion of the main body 200 and configured for a hose of a nozzle (not illustrated) to be connected thereto.

The body cover 210 is provided with the rotating-handle exposing hole 211 formed at a portion which a rotating handle member 110 faces. The rotating handle member 110 is exposed outwardly through the rotating-handle exposing hole 211. An end portion of the body cover 210 is rotatably disposed at the main body 200.

The main body 200 may include a fan motor unit (not illustrated) to generate a suction force of the vacuum cleaner 1. This has been known as a conventional technique; therefore, illustration and a detailed explanation thereof are omitted.

As illustrated in FIG. 4, the dust collecting unit 100 may include the rotating handle member 110, a dust container cover 120, a dust container 180, a centrifugal separating member 300, and a dust removing apparatus 400.

The rotating handle member 110 includes a rotating handle 111 and a rotating handle shaft 112. The rotating handle 111 may be formed to have as large diameter as possible so that a user can easily grip the rotating handle 111 and generate a large rotation force to the rotating handle shaft 112 using the rotating handle 111. The rotating handle shaft 112 has a lower end coupled with the dust removing apparatus 400 that is mounted in the dust collecting unit 100.

The dust container cover 120 has a first shaft hole 121 through which the rotating handle shaft 112 passes and an inlet 101 allowing outside air entering through the nozzle connecting hole 201 to flow inside the dust container 180. The first shaft hole 121 is formed to penetrate a center portion of the dust container cover 120. A size of an inner diameter of the first shaft hole 121 may be determined so that the rotating handle shaft 112 can rotate inside the first shaft hole 121 and have an airtight connection with the first shaft hole 121. Therefore, air is prevented from leaking from between the rotating handle shaft 112 and the first shaft hole 121 that are rotatably connected with each other.

A location on which the inlet 101 is formed is not limited. The inlet 101 may be formed on various locations such as the dust container 180, etc. according to a location through which outside air entering the dust collecting unit 100 enter the main body 200.

The dust container 180 may include a dust container handle 181 and a dust discharging cover 182.

The dust container handle 181 is formed on a side surface of the dust container 180 for a user to easily grip itself.

A dust-container air-discharging port 183 is formed on a center of the dust discharging cover 182. Air that enters through the inlet 101 and from which dust is separated is discharged through the dust-container air-discharging port 183. The dust discharging cover 182 is connected to a bottom end of the dust container 180 to be opened and closed.

Because the dust-container air-discharging port 183 is formed on the dust discharging cover 182 connected to the bottom end of the dust collecting unit 100 as described above, an air flowing passage for air entering the dust collecting unit 100 can be formed in the main body 200. As a result, the dust collecting unit 100 and the vacuum cleaner 1 can be formed in a compact size and in a lighter weight.

The centrifugal separating member 300 may include an upper filter cover 310, a filter 320, a lower filter cover 330 and a cyclone 340.

The filter 320 is formed in a cylindrical shape having a filter hollow portion 320a in a center thereof such as a pleated filter, etc.

The upper filter cover 310 has a second shaft hole 311 in a center thereof and is connected to a top surface of the filter 320 mounted inside the cyclone 340. At this time, the rotating handle shaft 112 passes through and is coupled to the second shaft hole 311 so that a lower end of the rotating handle shaft 112 is axially coupled with a dust removing shaft 411.

The lower filter cover 330 is formed to have a filter air-discharging port 331 and a filter air-discharging pipe 332 being in fluid communication with the filter air-discharging port 331 and supports a bottom surface of the filter 320 inside the centrifugal separating member 300.

The cyclone 340 is formed in a cylindrical pipe that has an upper portion formed as a grill 341 with grill holes 341a, a lower portion formed as a fixed pipe 343, an inner circumferential surface on a lower portion of which a plurality of lower-filter-cover supporting projections 344 is formed by a predetermined interval, and an outer circumferential surface to which a skirt 342 is connected.

The dust removing apparatus 400 is formed to have the dust removing shaft 411 and a plurality of dust removing plates 412 connected with the dust removing shaft 411. The dust removing shaft 411 is formed to have a top portion axially connected with the rotating handle shaft 112. The top portion 411a of the dust removing shaft 411 may be formed to be separated from the dust removing shaft 411 so that the dust removing shaft 411 and the rotating handle shaft 112 can be easily connected with each other with the upper filter cover 310 placing therebetween.

The plurality of dust removing plates 412 is radially disposed on an outer circumferential surface of the dust removing shaft 411.

The dust removing plates 412 disposed on the dust removing shaft 411 are formed to have a width as large as side ends 413 of the dust removing plates 412 are stuck by a predetermined depth in an inner circumferential surface of the filter hollow portion 320a when the dust removing plates 412 are coupled with the filter hollow portion 320a. At this time, the dust removing plates 412 may be formed from an elastic material in order to prevent the filter 320 from being broken and to apply a larger impact force to the filter 320 for removing dust.

In the dust removing apparatus 400, the dust removing plates 412 are not limited to have a structure as described above. The dust removing plates 412 may be formed in various shapes such as a helical plate helically connected to the dust removing shaft 411.

Figure 5:
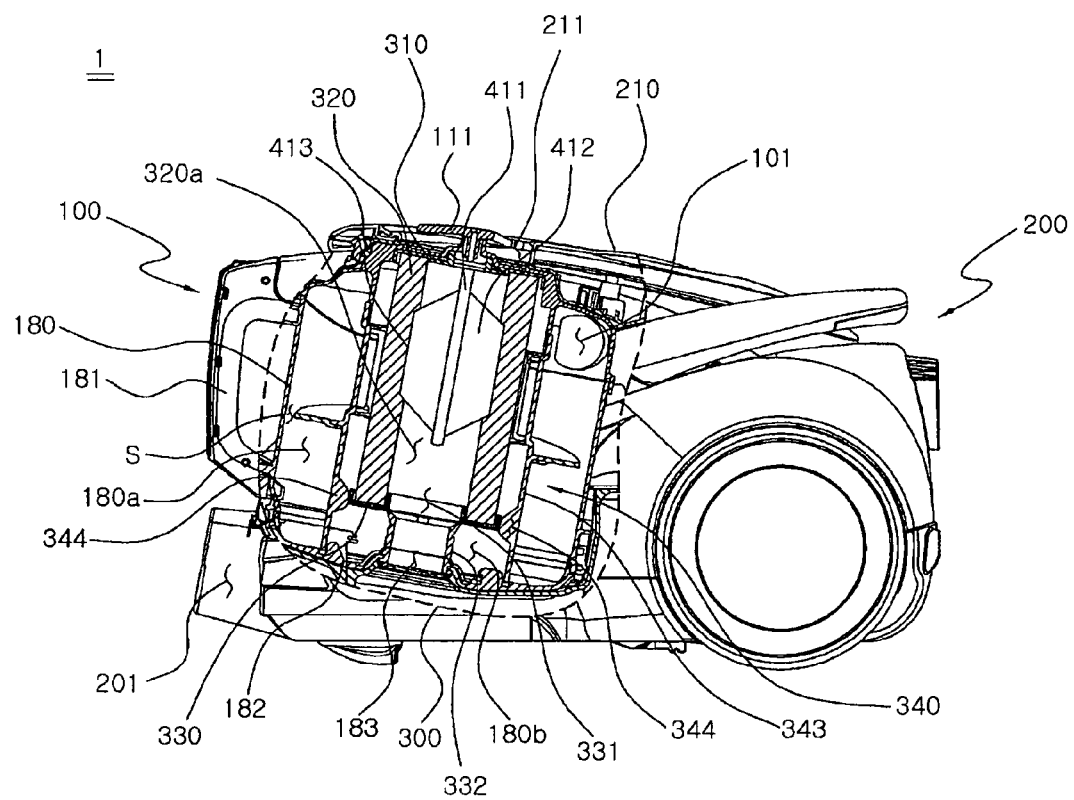
FIG. 5 is a partial sectional view illustrating the vacuum cleaner taken along a line V-V in FIG. 1.

FIG. 5 is a partial sectional view illustrating the vacuum cleaner 1 taken along a line V-V in FIG. 1.

Hereinafter, a structure of the dust collecting unit 100 will be explained with reference to FIGS. 4 and 5.

The cyclone 340 is connected inside the dust container 180 as illustrated in FIG. 5. The cyclone 340 connected inside the dust container 180 divides an inner space of the dust container 180 into a first dust collecting region 180a and a second dust collecting region 180b. The first dust collecting region 180a collects large and heavy dust separated outside the cyclone 340. The second dust collecting region 180b collects dust separated from the filter 320 by the dust removing apparatus 400.

The lower filter cover 330 inserted inside the cyclone 340 is supported and fixed by the lower-filter-cover supporting projections 344. Portions of the inner surface of the cyclone 340 placed among the lower-filter-cover supporting projections 344 are spaced apart a predetermined interval from the lower filter cover 330 to form spaces (not illustrated) through which dust separated from the filter 320 moves into the second dust collecting region 180b.

In a state that the lower filter cover 330 is fixed to the lower-filter-cover supporting projections 344, the filter 320 is inserted into the cyclone 340, and then, is supported and fixed by the lower filter cover 330. When the lower filter cover 330 is disposed inside the cyclone 340, the filter hollow portion 320a is in fluid communication with the filter air-discharging port 331 and the filter air-discharging port 331 is in fluid communication with the dust-container air-discharging port 183 by the filter air-discharging pipe 332. At this time, a sealing member (not illustrated) may be disposed on the dust-container air-discharging port 183 or the filter air-discharging pipe 332 to prevent air from leaking from a connecting portion thereof.

The rotating handle shaft 112 of the rotating handle member 110 passes through the dust container cover 120 and the upper filter cover 310 via the first shaft hole and the second shaft hole, and then, is axially connected with the dust removing shaft 411. Accordingly, a user can rotate the dust removing apparatus 400 using the rotating handle member 110.

In a state that the dust removing apparatus 400 and the rotating handle shaft 112 are axially connected with each other, when the dust container cover 120 is coupled with the dust container 180, the dust removing plates 412 are coupled with the filter 320 so that the side ends 413 of the dust removing plates 412 are stuck by a predetermined depth into the inner surface of the filter 320 forming the filter hollow, portion 320a.

The dust discharging cover 182 maintains a state in that it is connected to the bottom end of the dust container 180.

As illustrated in FIG. 3, the dust collecting unit 100 is assembled in a single body by the above described connection.

The dust collecting unit 100 that is assembled in a single body by the above described assembly process is mounted in a dust-collecting-unit receiving portion 300 (see FIG. 5) after the body cover 210 is opened as illustrated in FIG. 2. After the dust collecting unit 100 is received in the dust-collecting-unit receiving portion 300, the body cover 210 is closed to cause the dust collecting unit 100 to be securely fixed to the main body 200. At this time, the rotating handle 111 of the rotating handle member 110 is inserted into the rotating-handle exposing hole 211, thereby being exposed outside the vacuum cleaner 1.

Hereinafter, operation of the vacuum cleaner 1 in which the dust collecting unit 100 is mounted will be explained with reference to FIG. 5.

When the vacuum cleaner 1 is operated in a state that the dust collecting unit 100 is mounted therein as described above, outside air entering through the nozzle (not illustrated) connected to the nozzle connecting hole 201 flows into the inside of the dust container 180 through the inlet 101 formed on the upper portion of the dust collecting unit 100.

The air entering the inside of the dust container 180 rotates outside the cyclone 340 so as for dust to be separated from the air. Dust separated outside the cyclone 340 moves downwardly through a space S between the skirt 342 and the inner surface of the dust container 180 and is collected in the first dust collecting region 180a. The dust collected in the first dust collecting region 180a is prevented from back-flowing by the skirt 342.

The air from which dust is separated outside the cyclone 340 flows inside the cyclone 340 through the plurality of grill holes 341a formed on the grill 341. When the air entering inside the cyclone 340 passes through the filter 320, fine dust remaining in the air is separated from the air by the filter 320 and collected on the filter 320.

Air from which fine dust is separated by the filter 320 and that flows into the cyclone 340 is discharged outside the dust collecting unit 100 through the filter air-discharging port 331 and the dust-container air-discharging port 183 by the suction force of the vacuum cleaner 1.

When the vacuum cleaner 1 continues to operate, fine dust is excessively collected on the filter 320 so that an air discharging efficiency of the vacuum cleaner 1 is decreased.

At this time, for solving decline of the air-discharging efficiency the user rotates the rotating handle 111 to remove dust collected on the filter 320.

As the user rotates the rotating handle 111, the side ends 413 of the dust removing plates 412 are rotated in contact with the inner surface of the filter 320, thereby separating dust collected on the filter 320 from the filter 320.

The dust separated from the filter 320 moves downwardly through the spaces (not illustrated) formed between the lower filter cover 330 and the portions of the inner surface of the cyclone 340 among the lower-filter-cover supporting projections 344 and is collected in the second dust collecting region 180b. Fine dust falling in the filter hollow portion 320a of the filter 320 is discharged with air and is collected by a prefilter or an air discharging filter (not illustrated) of the vacuum cleaner 1.

A process for removing dust from the filter 320 as described above can be performed in a state that the dust collecting unit 100 is separated from the main body 200 of the vacuum cleaner 1 and in a state that the dust collecting unit 100 is mounted in the main body 200 of the vacuum cleaner 1.

The process for removing dust collected on the filter 320 also can be performed during operation of the vacuum cleaner 1. In this case, when the side ends 413 of the dust removing plates 412 rotates in contact with the filter 320, the dust collected on the filter 320 is more easily separated from the filter 320 by an air current passed through the filter 320 by the suction force of the vacuum cleaner 1.

Accordingly, during operation of the vacuum cleaner 1, efficiency for removing dust collected on the filter 320 is significantly increased.

Dusts collected in the first collecting region 180a and the second collecting region 180b during operation of the vacuum cleaner 1 and the process for removing dust from the filter 320 by the dust removing apparatus 400 are at the same time dumped by opening the dust discharging cover 182 after the dust collecting unit 100 is separated from the main body 200.

In the above described explanation of an embodiment of the present disclosure, the rotating handle member 110 is manually rotated; however, this does not limit the structure of the rotating handle member 110. Alternatively, if a rotation-power transmitting member such as a gear device, etc. is additionally disposed in the rotating handle member 110, a motor for supplying a rotation power to the rotation-power transmitting member is disposed in the body cover 210, and another gear transmitting the rotation power to the gear device disposed in the rotating handle member 110 is disposed in the inner circumferential surface of the rotating-handle exposing hole 211, the rotating handle member 110 is automatically rotated to remove dust from the filter 320.

A dust collecting unit having a dust removing apparatus according to an embodiment of the present disclosure can be used not only for canister type or upright type vacuum cleaners but also for other dust collecting apparatuses.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A vacuum cleaner having a dust removing apparatus comprising:
   a main body in which a dust collecting unit is disposed;
   a filter disposed inside the dust collecting unit;
   a dust removing apparatus to remove dust from the filter;
   a rotating handle that allows the dust removing apparatus to be rotated, the rotating handle disposed in an outer surface of the dust collecting unit; and
   a body cover in which a rotating-handle exposing hole is formed for the rotating handle to be exposed outside in a state that the dust collecting unit is disposed in the main body, the body cover rotatably disposed at the main body.

2. The vacuum cleaner of claim 1, wherein the dust collecting unit is configured to rotate the dust removing apparatus by the rotating handle in a state that the dust collecting unit is disposed in the main body or in a state that the dust collecting unit is separated from the main body.

3. The vacuum cleaner of claim 1, wherein the dust collecting unit is configured to rotate the dust removing apparatus by the rotating handle during operation of the vacuum cleaner.

4. The vacuum cleaner of claim 1, wherein the dust collecting unit has an inner space divided into a first dust collecting region to collecting dust separated in a centrifugal separating member and a second dust collecting region to collecting dust removing from the filter.

5. The vacuum cleaner of claim 4, wherein the dust collecting unit further comprises a dust discharging cover that is connected to a lower end of the dust collecting unit to be opened and closed to discharge at the same time the dust collected both in the first dust collecting region and the second dust collecting region, and
   the dust discharging cover includes a dust-container air-discharging port to discharge air from the dust collecting unit.

6. The vacuum cleaner of claim 1, wherein the rotating handle is configured to be rotated by a motor.

* * * * *